US007181425B1

(12) United States Patent
Cha

(10) Patent No.: US 7,181,425 B1
(45) Date of Patent: Feb. 20, 2007

(54) AUTOMATIC ORDERING METHOD AND SYSTEM FOR TRADING OF STOCK, BOND, ITEM, FUTURE INDEX, OPTION, INDEX, CURRENT AND SO ON

(76) Inventor: Min-Ho Cha, 109-204 Daeah Apt., Kayang-Dong, Kangseo-Gu, Seoul (KR)

( * ) Notice: Subject to any disclaimer, the term of this patent is extended or adjusted under 35 U.S.C. 154(b) by 0 days.

(21) Appl. No.: 09/509,326

(22) PCT Filed: Feb. 16, 2000

(86) PCT No.: PCT/KR00/00125

§ 371 (c)(1),
(2), (4) Date: Mar. 24, 2000

(87) PCT Pub. No.: WO00/51043

PCT Pub. Date: Aug. 31, 2000

(30) Foreign Application Priority Data

Feb. 24, 1999 (KR) .................................... 99-6108
Sep. 3, 1999 (KR) .................................. 99-37343

(51) Int. Cl.
*G06Q 40/00* (2006.01)
(52) U.S. Cl. ............................... 705/37; 705/36; 705/37
(58) Field of Classification Search .................... 705/5, 705/35–37; 364/408
See application file for complete search history.

(56) References Cited

U.S. PATENT DOCUMENTS

| 4,412,287 | A | * | 10/1983 | Braddock, III | ............... | 705/37 |
| 4,674,044 | A | * | 6/1987 | Kalmus et al. | ............... | 705/37 |
| 5,297,031 | A | * | 3/1994 | Gutterman et al. | ........... | 705/37 |
| 5,787,402 | A | * | 7/1998 | Potter et al. | ................... | 705/37 |
| 5,797,127 | A | * | 8/1998 | Walker et al. | ................ | 705/37 |
| 6,014,643 | A | * | 1/2000 | Minton | ........................ | 705/37 |
| 6,029,146 | A | * | 2/2000 | Hawkins et al. | .............. | 705/35 |

FOREIGN PATENT DOCUMENTS

| DE | 19956626 | * 10/2000 |
| EP | 0 401 203 A2 | 12/1990 |
| JP | 1115878 | 5/1989 |
| WO | WO96/34357 | 10/1996 |

OTHER PUBLICATIONS

Ameritrade Web Page, Feb. 11, 1998 "Client Trade Here". http://web1.archive.org/web/19980211222921/http://www.ameritrade.com.*

(Continued)

*Primary Examiner*—Jagdish N. Patel
*Assistant Examiner*—Harish T. Dass
(74) *Attorney, Agent, or Firm*—Marger Johnson & McCollom, P.C.

(57) ABSTRACT

The present invention relates to an automatic ordering method and system for trading of stocks, bonds, items, futures, options, indexes, foreign currencies through data communication network, and more particularly to an automatic ordering method and system by computer according to certain conditions predetermined by an investor wherein the automatic ordering method for trading of stocks, bonds, items, futures, options, indexes, foreign currencies and the like through data communication network according to the present invention comprises the steps of: determining a trade-desired object in a computer system to input automatic trade conditions containing purchase and selling conditions; ordering purchase and selling according to the trade conditions through the data communication network; discriminating whether the purchase order and/or selling order has been contracted through the data communication network; and placing new purchase and/or selling orders through the data communication network according to the trade conditions predetermined by the computer when either the purchase order or the selling order is contracted.

13 Claims, 7 Drawing Sheets

OTHER PUBLICATIONS

E★Trade Web Page, Apr. 8, 1997 "Welcome to the Smarter way to Invest". http://web1.archive.org/web/19970409110234/http://www.etrade.com.*

E★Trade Web page, Feb. 16, 1998 "Master the Market". http://web1.archive.org/web/1998021608185/http://www.etrade.com.*

* cited by examiner

FIG.6

| ITEM CODE | 12260 | DEF COMPANY ▽ | CLOSING PRICE |
|---|---|---|---|
| INPUT AMOUNT | 10,000,000 WON | POSSESSED STOCKS | 10,000 SHARES |

○ INITIAL TRADE CONDITION

CURRENT PRICE

INITIAL TRADE  [SELLING ▽]   [10,000] WON   [100] SHARES

○ AUTOMATIC TRADE CONDITION

REFERENCE QUANTITY [100] SHARES   FEE [0.25] %

PURCHASE CONDITION  UNIT PRICE [FIXED AMOUNT(WON) ▽] [500] WON   QUANTITY [FIXED RATE (%) ▽] [ ]

SELLING CONDITION  UNIT PRICE [FIXED AMOUNT(WON) ▽] [1.000] WON   QUANTITY [FIXED RATE (%) ▽] [ ]

EXTRA TRADE CONDITION  [FIXED RATE (%) ▽] [ ] WON   TARGET PROFIT RATE [20] %

[TRADE TABLE (APPLICATION)]
628

FIG.7

AUTOMATIC TRADE TABLE

| PURCHASE | | | SELLING | |
|---|---|---|---|---|
| ORDER QUANTITY | PURCHASE PRICE | | ORDER QUANTITY | SELLING PRICE |
| 100 | 13,500 | | 100 | 14,000 |
| 100 | 12,500 | | 100 | 13,000 |
| 100 | 11,500 | | 100 | 12,000 |
| 100 | 10,500 | | 100 | 11,000 |
| 100 | 9,500 | | 100 | 10,000 |
| 100 | 8,500 | | 100 | 9,000 |
| 100 | 7,500 | | 100 | 8,000 |
| 100 | 6,500 | | 100 | 7,000 |
| 100 | 5,500 | | 100 | 6,000 |
| 100 | 4,500 | | 100 | 5,000 |
| 100 | 3,500 | | 100 | 4,000 |
| 100 | 2,500 | | 100 | 3,000 |
| 100 | 1,500 | | 100 | 2,000 |
| 100 | 100 | | 100 | 1,000 |

TRADE TABLE CONFIRMATION

AUTOMATIC ORDERING METHOD AND SYSTEM FOR TRADING OF STOCK, BOND, ITEM, FUTURE INDEX, OPTION, INDEX, CURRENT AND SO ON

BACKGROUND OF THE INVENTION

Field of the Invention

The present invention relates to an automatic ordering method and system for trading of stocks, bonds, items, futures, options, indexes, foreign currencies through data communication network, and more particularly to an automatic ordering method and system by way of computer according to a predetermined condition set by an investor.

Known are the method and system for trading articles such as stocks, foreign exchanges, cereals, ores, futures and the like. In the conventional method and system, an investor inputs into a computer desired purchase (or selling) price and desired purchase (or selling) quantity of certain articles, securities, foreign exchanges or indexes to generate a trade order and to conclude a trade. In this regard, trade method of articles, foreign currency exchanges, securities, indexes and the like through a computer network is the same as the current stock trade method through a computer network, such that the present invention will be described hereinafter with reference to a stock trade by way of example.

With reference to the stock trade as an example, the present invention relates to a method and a system, where a user pre-set a trade condition for purchase or selling order for a particular stock, and a computer places an automatic purchase or selling order according to the trade condition.

It has been a general practice for a stock holder to directly order a selling or buying of a stock at a securities company or to commission an employee at a securities company to order a selling or buying of a stock under his or her own decision. When a stock holder intends to order a selling or buying of stock, he or she visits a securities company in person, calls the company, uses a radio communication terminal provided by the company, utilizes a personal computer communication network system or uses an internet.

Now, recent stock trade method at a stock exchange market (SEM) and some of the terminologies in relation to stock trade are briefly described using the example of Korea Stock Exchange (KSE).

As of February 1999, a stock price is based on a closing of a previous day and can rise or fall within a range of 15% thereof. The KSE opens at 9 in the morning during workdays except for holidays, weekend and yearend, and closes at 3 in the afternoon. A "daily upper limit" in the stock dealing means a price 15% soared above the closing price of the previous day and a "daily lower limit" defines a price 15% declined based on the closing price of the previous day.

Purchase and sale of a stock are made from 9 a.m. when the stock market opens to 3 p.m., but orders for stock dealing can be reserved even from 5 p.m. to before 9 a.m. the following day after the market is closed in case a communication by computer, ARS, Internet and the like are utilized.

Referring to FIG. 1, a buying and selling method of stocks after order thereto is given utilizing the communication by computer or internet is described hereinafter.

A stock holder uses his or her computer system 10 to connect same to a computer system 20 of a securities company the stock holder deals with, and to confirm a balance of an account, residual quantity of stocks, present price or closing price of his or her present stock. Then when the stock holder orders a buying or a selling of a particular stock, the order is recorded in the computer system of the securities company, which is then transferred to a computer system 30 of the KSE after a usual procedure necessary for the sale and purchase of the stock dealings is processed in the securities company.

When the order of sale and purchase is received via a network 40 from the securities company, the computer system 30 in the KSE compares selling order price and quantity and buying order price and quantity and allows a purchase and sale to be concluded at a particular price.

Generally, this kind of buying and selling is repeated from opening to closing of the stock market. This kind of method is similarly performed when the stock holder visits the securities company. Only difference is that a step is deleted where a stock holder utilizes his or her computer system 10 to input a particular data.

In this kind of transaction, whether the deal is a purchase order or a sale order, an item code of a stock to be bought or sold, desired purchasing or selling price, desired purchasing or selling quantity and the like should be input via a computer or ARS by a stock holder or a staff person at the securities company.

Under the stock transaction method thus described, predetermined fundamental information data (by way of example, stock account, secret number, etc) and buying/selling condition information data (by way of example, stock item code, desired buying/selling prices, desired buying/selling quantity, etc) should be input via the computer system 10 or 20 by a stock holder or staff person at the securities company at every dealing time point. Furthermore, in order to place a buying or selling order corresponding to a particular purchase or sale, buying or selling contract details at every moment should be monitored and an order corresponding thereto should be timely placed.

However, there is a problem in these types of behaviors in that lots of time are consumed and people who are busy at offices and who can hardly spend time at securities company cannot cope therewith.

There is another problem in that staff at the securities company spend too much time in placing every buying or selling order, in the view point of the securities company, too much personal expenses are spent, and if there is any erroneous input of necessary information data due to erroneous typing and the like, the securities company is compelled to sustain a large economic loss.

Meanwhile, many stock investors are thinking about provisional desired purchase price, purchase quantity, desired selling price and selling quantity of particular stock in which they intend to invest. However, in order to comprehend whether the current price of the stock has reached a desired purchase or selling price, they should be always aware of the stock price change at the stock market. However, it is not that easy to constantly observe the changing stock prices.

SUMMARY OF THE INVENTION

The present invention is disclosed to solve the aforementioned problems and it is an object of the present invention to provide an automatic order method and system for allowing an investor to invest without concerning himself or herself about stock market change and new information.

The present invention also provide an automatic ordering method and system adapted to repeatedly place purchase and selling orders according to predetermined conditions on behalf of investors including individual investors and institutional investors.

In accordance with one object of the present invention there is provided an automatic ordering method, the automatic ordering method for trading of stocks, bonds, items, futures, options, indexes, foreign currencies and the like through data communication network comprises the steps of:

determining a trade-desired object and inputting an automatic trade condition containing purchase and selling conditions in a computer system;

issuing purchase and/or selling order(s) according to the automatic trade conditions through the data communication network;

discriminating whether the purchase order and/or selling order has been contracted through the data communication network; and placing new purchase and/or selling order(s) by the computer through the data communication network according to the automatic trade conditions when either the purchase order or the selling order is contracted.

In accordance with another object of the present invention, there is provided an automatic stock ordering method using a computer system connected to a data communication network, the method comprising the steps of:

determining a trade-desired stock and inputting an automatic trade condition including purchase and selling conditions at the computer system;

placing through the data communication network a stock purchase order or stock selling order according to the trade condition;

discriminating whether or not the stock selling order or stock purchase order has been contracted through the data communication network; and placing by a commuter through the data communication network a new stock selling or purchase order according to the automatic trade condition when the stock selling or purchase order is contracted.

In accordance with still another object of the present invention, there is provided an automatic stock ordering method, the method of trading stocks using a computer system connected to data communication network, the method comprising the steps of:

determining a trade-desired stock and inputting an automatic trade condition including a purchase condition and a selling condition in the computer system;

placing through the data communication network one or more than one stock selling order(s) and one or more than one stock purchase order(s) according to the trade condition;

discriminating whether or not the stock selling or purchase order has been contracted through the data communication network; and placing by the computer through the data communication network new stock selling and purchase orders according to the automatic stock trade condition when the stock selling or purchase order is contracted.

In accordance with still further object of the present invention, there is provided an automatic ordering system of stocks, the stock ordering system including a user computer system connectable to a computer system at the Korea Stock Exchange through a data communication network, the system comprising:

a user interface at the user computer system;

a memory device for storing a basic information data including item code of stock and account number of a stock holder input to the computer system through the user interface;

a trade condition control module for storing automatic stock trade condition data containing desired selling price, desired selling quantity, desired purchase price, desired purchase quantity for trade of the stock input to the computer system through the user interface; and a trade order control module for discriminating whether the automatic stock trade condition has been met and for placing a stock trade order according to the automatic stock trade condition through the data communication network if the condition is met.

BRIEF DESCRIPTION OF THE DRAWINGS

For fuller understanding of the nature and objects of the invention, reference should be made to the following detailed description taken in conjunction with the accompanying drawings in which:

FIG. 6 is a user interface for illustrating the third and the fourth embodiments of an automatic ordering method and system of stock dealings according to the present invention; and FIG. 7 is an automatic trade table generated by the third and the fourth embodiments according to the present invention.

DETAILED DESCRIPTION OF THE INVENTION

Preferred embodiments of the present invention will now be described in detail with reference to the accompanying drawings.

Figure 2:
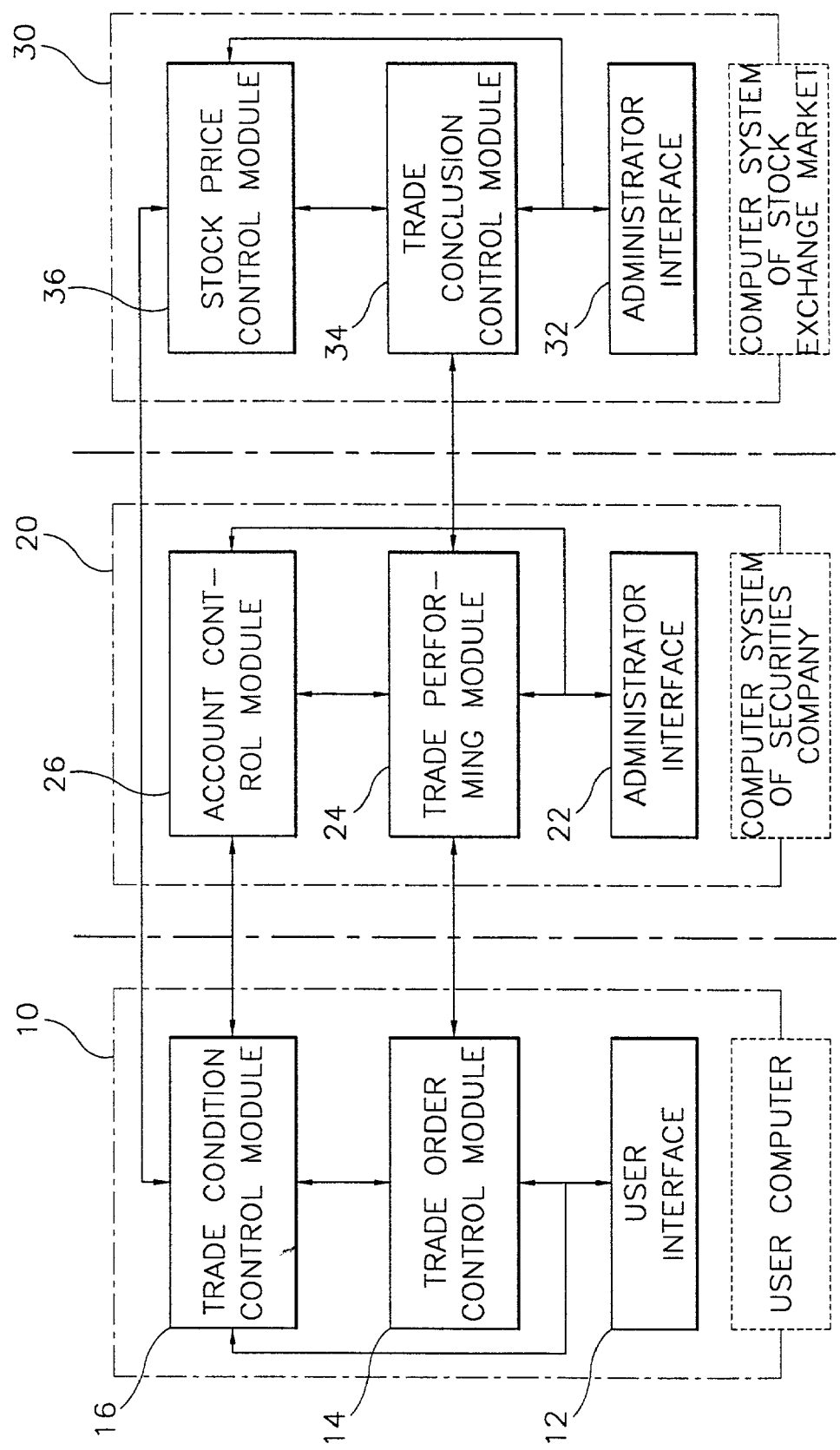
FIG. 2 is a conceptual block diagram for illustrating an embodiment of an automatic ordering system of stock dealings according to the present invention.

FIG. 2 is a conceptual block diagram for illustrating a first embodiment of an automatic ordering system of stock dealings or stock trade according to the present invention.

Figure 1:
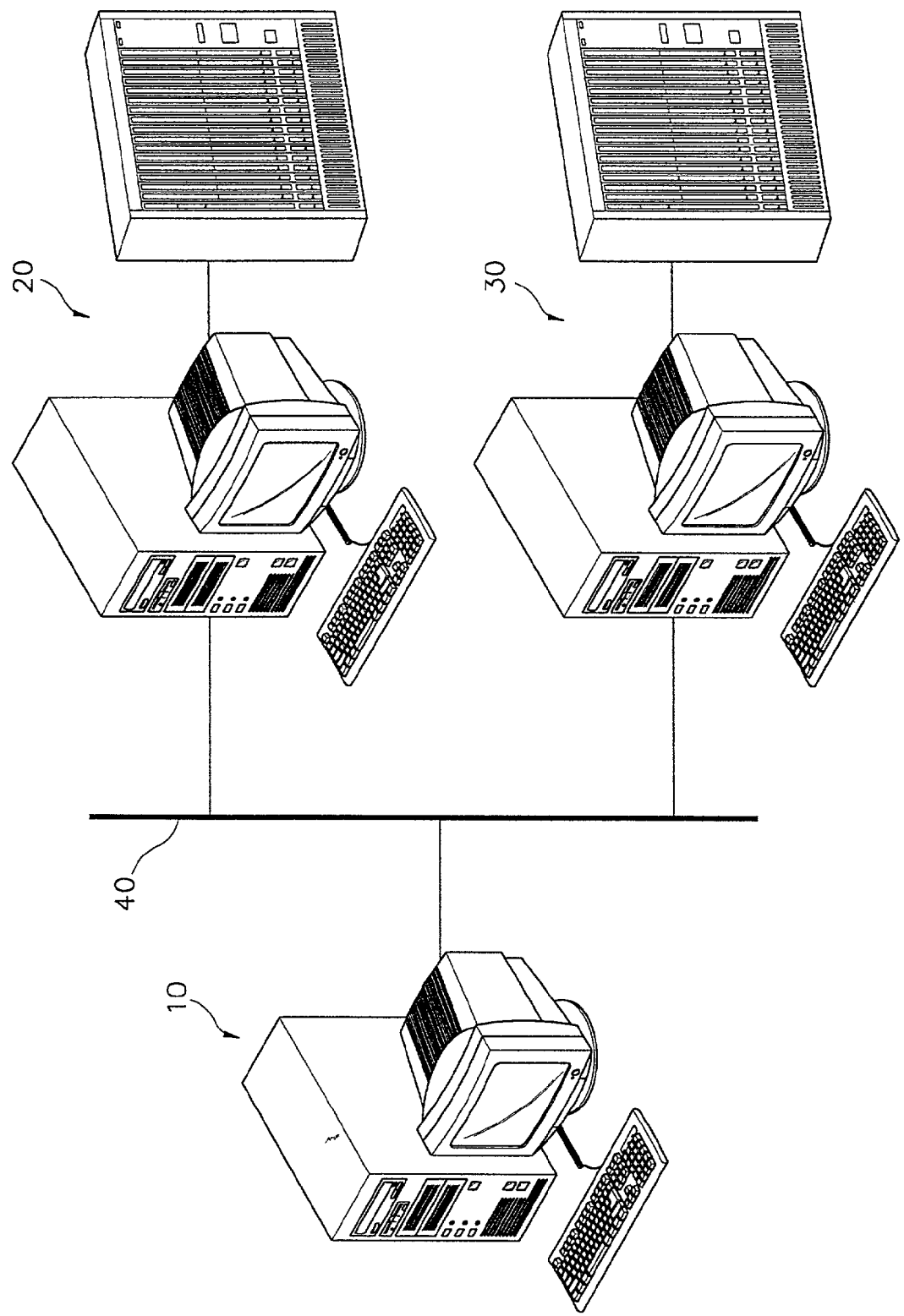
FIG. 1 is a conceptual drawing of a stock dealing system via a network.

In other words, an automatic ordering system of stock dealing according to the present invention (hereinafter referred to an "automatic ordering system") can be embodied, as illustrated in FIG. 1, by user computer system 10 (hereinafter referred to as "user's computer"), a computer system of securities company 20 and a computer system of SEM 30 mutually connected for performing data communication via a network 40.

Furthermore, the user computer 10, where an automatic ordering system according to the present invention can be embodied, includes a user interface 12 for interfacing with a stock holder, a trade (deal) condition control module 16 for storing information on a stock holder (by way of example, name, quantity, and purchasing price of possessed stock, and available balance and automatic trade conditions established by the stock holder and for revising to a new stock dealing condition according to user manipulation or concluded deal state, and a trade order control module 14 for issuing a dealing order of concerned stock according to the automatic trade conditions.

Of course, the user computer 10, although not illustrated in FIG. 2, further includes softwares such as operation system necessary for operation of the computer system and various applications and hardwares such as central processing unit and hard disks. The user computer still further includes hardwares (not shown) such as a modem, a LAN adapter for executing a data communication with the computer system 20 at a securities company or with the computer system 30 at the SEM and softwares such as data communication control application and the like, and all these are generally referred to as a communication control module (not shown).

The computer system 20 at the securities company, connected to the user computer to via the network 40 in order to perform a data communication, includes an administrator's interface 22 for interfacing with an administrator of the securities company, a deal (trade) performing module 24 for receiving an order from the user computer 10 and transmitting same to the computer system 30 at SEM to thereby allow a stock trade to be concluded, and an account control module 26 for storing a useable balance and stock residual quantity of stock account of a particular stock holder and for amending same according to contracted dealings.

It should be also noted that the computer system 20 at the securities company is further disposed with hardwares and softwares for executing a general function as a computer system, quite similar to those of the user computer 10.

Part or whole or modules 14 and 16 of the user computer 10 may be integrated to a computer system 20 of a securities company. Construction may be made such that a user is simply connected to a company of a securities company through the user interface 12. Furthermore, in a country where it is legally allowed for a user to directly connect to a computer system 30 of a stock market in placing a stock trade order, the computer system 20 of a securities company may be integrated to the user computer 10.

In case a securities company invests in a stock on behalf of a client, hardware and software resources of the user computer 10 are integrated to the computer system 20 of the securities company.

Next, the computer system 30 at the SEM is provided with an administrator interface 32 for interfacing an administrator of the SEM, a deal (trade) conclusion control module 34 for receiving and comparing a purchase order and a selling order from each computer system 20 at every securities company to thereafter conclude the dealings and a stock price control module 36 for correcting the stock price according to the concluded stock quantity and price. The computer system 30 at the SEM further includes softwares and hardwares for performing a general function as a computer system, quite similar to those of the user computer 10 or computer system 20 at the securities company.

Each module illustrated in FIG. 2 performs a mutual data communication within a computer system each module belongs to, and a data communication is executed via the data communication control module even among the modules included in other computer systems. Data flow and connecting relation according to performance of these data communication are schematically illustrated by two-way arrows in FIG. 2. Although FIG. 2 illustrates a block diagram where the user computer 10 is directly connected to the computer system 30 of the SEM, it should be noted that the direct connection is not indispensable but the user computer 10 may be connected only to the computer system 20 of the securities company. Hardwares and softwares for accomplishing the data communication are well known to a person who has ordinary knowledge in a technical field to which the present invention belongs (hereinafter referred to as "a person skilled in the art"), and detailed description of the hardwares and softwares will not be made here as they are not directly necessary matters in describing subject matters of the present invention.

It is an easy matter for a person in the art to adequately arrange or change computer system resources between the user computer 10, computer system 20 of a securities company and computer system 30 of KSE. Accordingly, it should be noted that FIG. 2 is just shown for illustrating one embodiment and a system for embodying the present invention may be variably modified by a person in the art.

Next, embodiments of the automatic stock ordering method and system will be described in detail with reference to FIGS. 3, 4, 5, 6 and 7.

Figure 3:
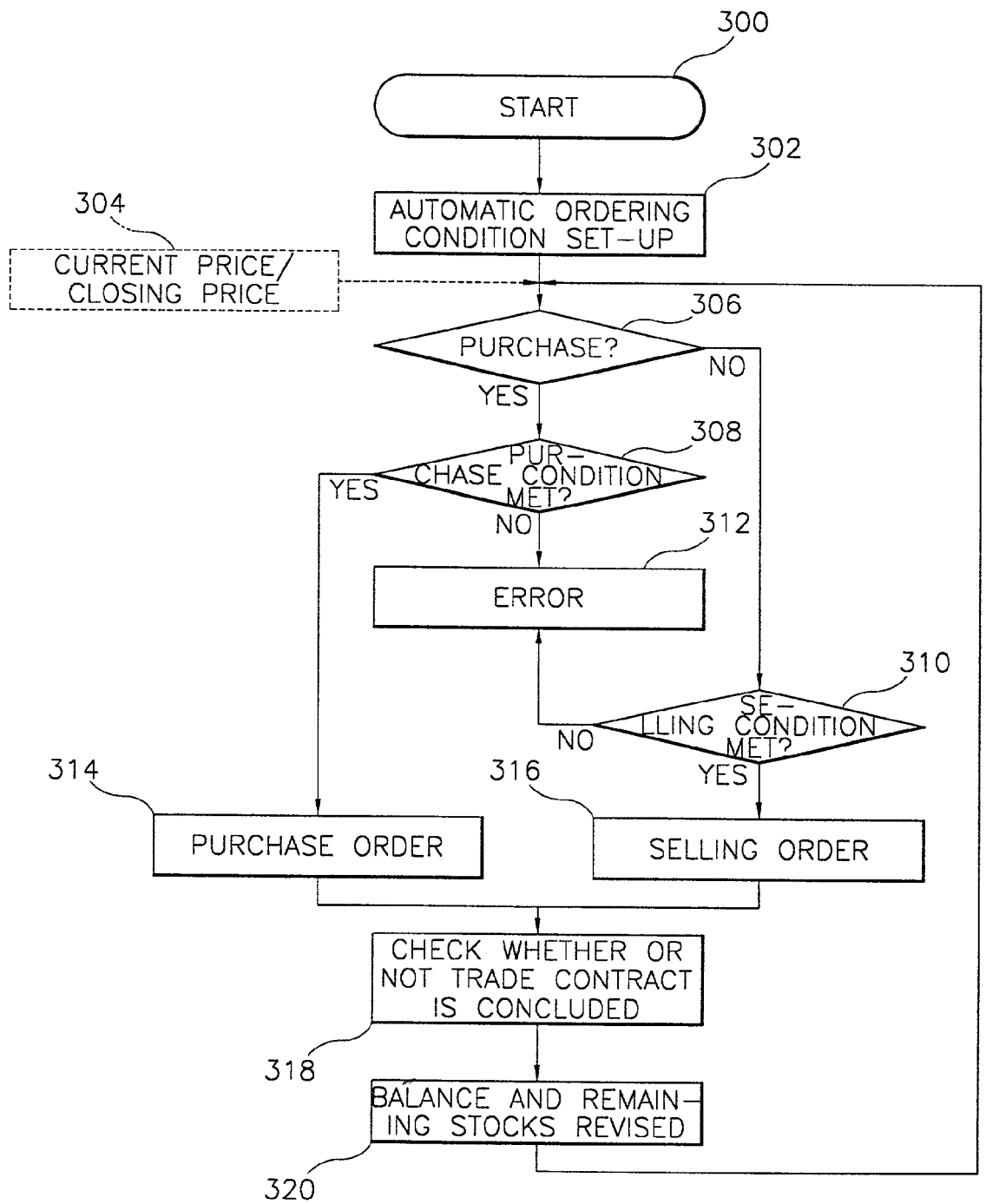
FIG. 3 is a flow chart for illustrating the first and the second embodiments of an automatic ordering method of stock dealings according to the present invention.

FIG. 3 is a flow chart for illustrating a first embodiment of automatic ordering method according to the present invention.

According to the first embodiment, when the automatic ordering system starts operation, step 300, a basic data including a stock account number, a secret number thereof, name and registration number of stock holder, item code of possessed stock and the like are registered through the user interface 12 of the user computer 10 and are stored. A one-time registration of the basic information data suffices at the initial start of the automatic ordering system and there is no need of additional registration unless the basic information data is to be amended.

Next, the stock holder establishes an automatic trade condition for selling and purchasing certain items of stocks, step 302. A user interface as shown in FIG. 4 may be provided to the user to expedite the establishment of the automatic trade condition.

Figure 4:
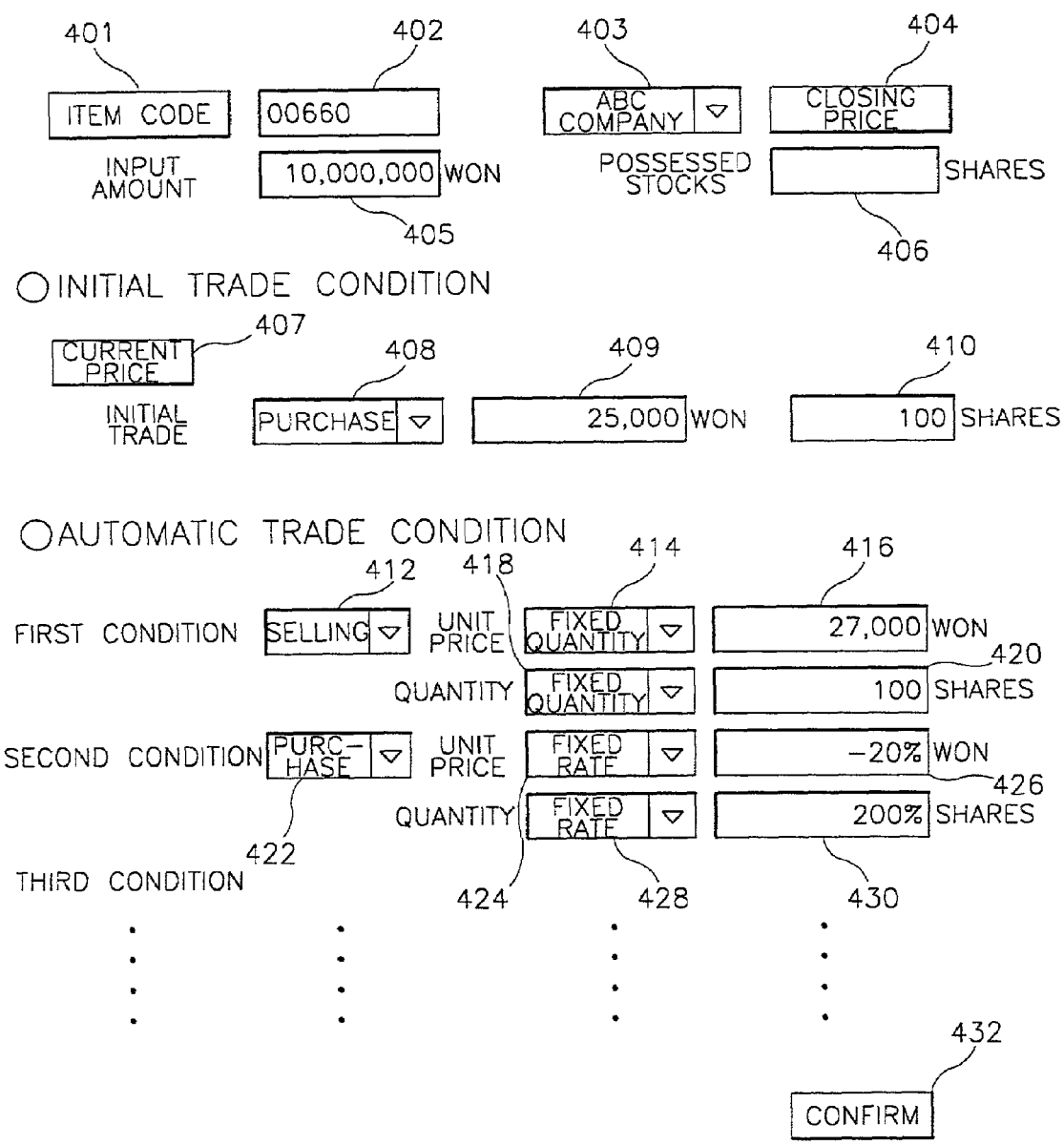
FIG. 4 is a user interface for illustrating the first and the second embodiments of an automatic ordering method of stock dealings according to the present invention.

A item code selection button 401 in FIG. 4 is selectively provided to search or select a share to invest in. In order to select a stock of ABC company 403 as investment item, an item code of the ABC company 403, by way of example, '00660' 402 may be selected or input. A referral button 404 of share price of previous day may be selectively provided. An amount to be used for automatic trade is entered in an amount entry column 405. The entry amount should not necessarily accord with remainder in the stock account. When there remains possessed stocks to be automatically traded, the number of stocks to be automatically traded are entered in a column 406. The number of stocks entered into the column 406 should not be necessarily the whole possessed stocks.

Establishment of initial trade condition is not part of the present invention. The initial trade condition is the same as the method and system provided for cyber stock investors by the current securities companies. A referral button 407 of current share price is a selective item.

Column 408 is a button for selecting purchase or selling. The present example has established an initial trade where 100 shares 410 of ABC company are purchased 408 at 25,000 Korean Won per share.

The automatic trade condition is based on a presumption that an initial trade will be contracted. In order to set up an automatic trade condition, columns 412 and 422 for selected selling or purchase, columns 414, 418, 424 and 428 for selecting unit price and quantity at fixed quantity or fixed rate, and columns 416, 420, 426 and 430 for entering the unit price or quantity at fixed quantity or fixed rate are provided.

The present example as a first automatic trade condition has established a selling 412 of 100 shares 420 purchased at the initial trade at 27,000 Won per share.

A second automatic trade condition based on the contract of the first condition is established at purchase 422 more increased in quantity 428 and 430 by 200% and lower unit prices 424 and 426 by 20% than those of the first trade. In other words, the condition is buying 200 stocks at 21,600 Won per share.

These kinds of automatic trade conditions may be established up to an appropriate number, by way of example, up to a fifth condition or up to a tenth condition, in the same method. The automatic trade condition is confirmed by pressing a confirmation button 432. However, the automatic trade condition is allowed to be changed or amended at all times by a user.

A selling order according to the predetermined first condition is generated by computer regardless of the current share price right after the initial trade is contracted. In other words, a discrimination is made at step 306 in FIG. 3 as to whether the automatic trade condition is a purchase or a selling, and if the condition is established as selling as illustrated in FIG. 4, flow advances to step 310 to discriminate whether the selling condition has been met. The discrimination of the selling condition is a discrimination as to whether established selling quantity of share is possessed, or whether a designated selling price is within an allowable trade range (i.e., daily upper limit and daily lower limit).

If the condition is met, a selling order is automatically generated by computer, step 316, and the computer discriminates whether the selling order is contracted, step 318.

If the selling order is not contracted on the same day, same order is generated by computer every day until the selling order is concluded. If the order is contracted, the account remainder and share residual quantity are amended, step 320, and the computer discriminates whether or not the condition is met according to the previously set-up second automatic trade condition. If the second condition is met, a new order is immediately generated. In other words, as soon as the first a trade is concluded, a second trade order is actually created. A stock trade order is automatically generated by the computer as much as the automatic trade condition is established according to this method. When the established automatic trade conditions are all concluded, automatic trade is stopped. In the present invention, completion or the automatic trade is advised to a user by an appropriate method. This method may include beeper, E-mail, cellular telephone or the like. This notifying method can be realized by well-known technologies.

The first embodiment includes a step 304 for receiving the closing price of previous day and a step 312 for notifying an error when the purchase or selling condition is not met at steps 308 and 310.

A discrimination should be made as to whether established trade price is within the daily upper limit or daily lower limit when the stock trade order is placed only within the limits as in Korea, and if the order is placed out of the limits, errors 312 are created. Furthermore, in case only partial quantity of trade order is concluded, or trade is fulfilled at a price different from trade order price (Handling of this case will be described later), an instance can occur where account remainder and stock residual quantity remain against anticipation to thereby generate an error.

If an error happens, the automatic trade is stopped and generation of error is advised to a user by an appropriate method. When the error is notified, the user may change or amend the automatic trade condition to thereafter process the automatic trade continuously.

According to the first embodiment, it is possible for the user to perform the trade of shares as desired without continuously monitoring changes of the stock market.

Step 304 in FIG. 3 at the second embodiment of the present invention includes a step for receiving the closing price of the previous day and the present price of concerned stock as well for comparison with the automatic trade condition. There is a disadvantage in the first embodiment in that, when a stock trade order is created regardless of the current price or invested money is too much, an investment strategy may be exposed to other investors. The second embodiment therefore makes the stock purchase order or selling order generated when the present price at the stock market reaches an established price of established automatic trade condition, or makes the stock selling order created when the present price is lower by a predetermined percentage (by way of example, 5%) than established automatic selling price, or makes the stock purchase order created when the current price is higher by a predetermined percentage (by way of example, 4%) than established automatic purchase price.

The second embodiment can be embodied by additionally providing at the automatic trade condition establishment column of FIG. 4 an establishment column for limiting a generated period of time of the trade order, and by comparing the current price with trade order generation time condition established at steps 308 and 310 in FIG. 3. Under these circumstances, if the time condition is not met, steps 308 and 310 should be continuously checked until the time condition is satisfied without creating an error 312. The time condition comparison means according to the second embodiment may be utilized by a known art to integrate a trade order control module 14 and a trade condition control module 16 in FIG. 2.

Now, a third embodiment of the present invention will be described with reference to FIGS. 5, 6 and 7. At though the first and second embodiments is characterized in that either the purchase order or selling order is automatically created according to established automatic trade condition, the third embodiment of the present invention is characterized in that both the purchase order and selling order are simultaneously generated according to the established automatic trade conditions as described later.

Figure 5:
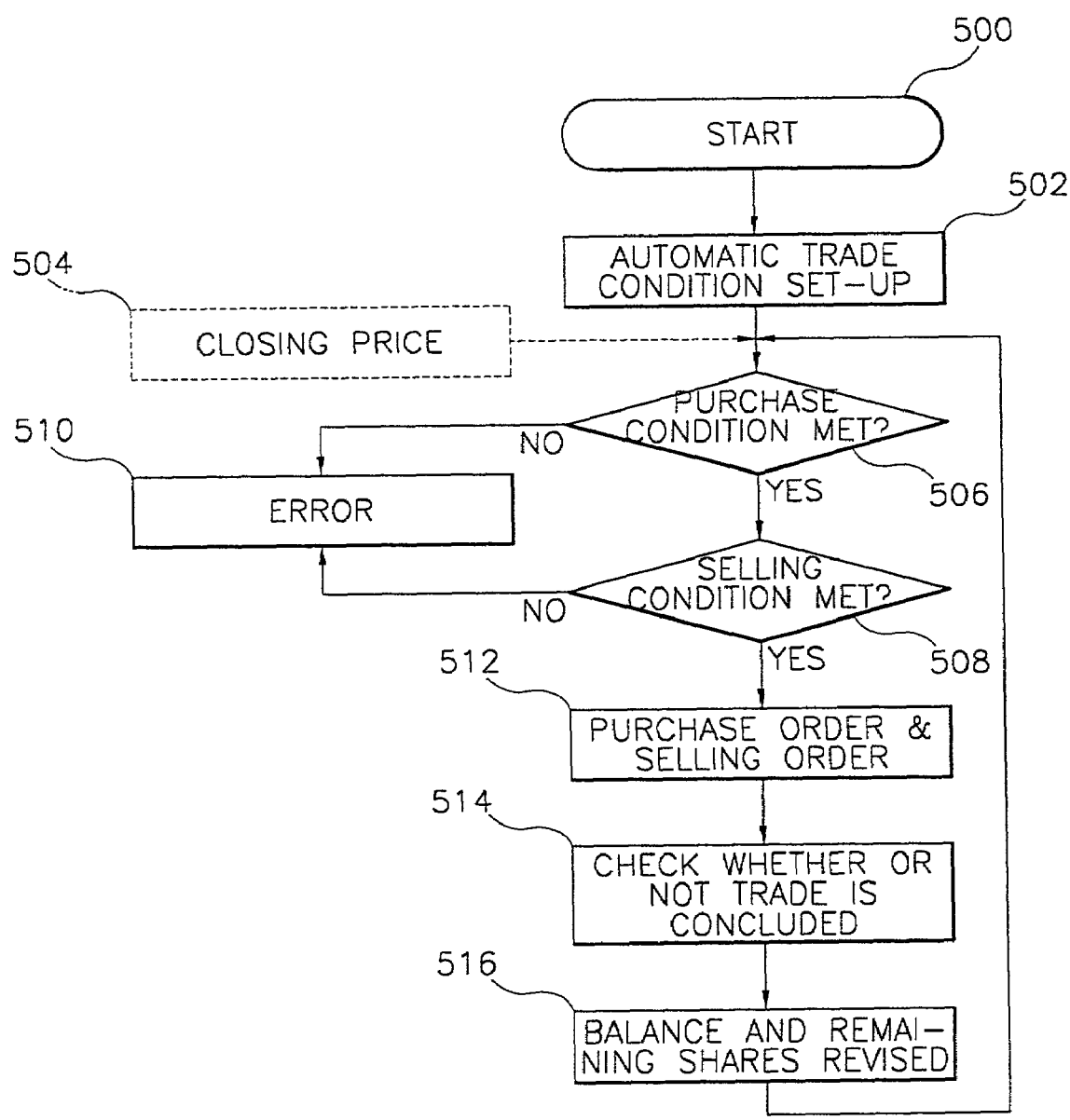
FIG. 5 is a flow chart for illustrating the third and the fourth embodiments of an automatic ordering method and system of stock dealings according to the present invention.

As illustrated in FIG. 5, a system is activated, step 500, according to the third embodiment to set up an automatic trade condition, step 502.

The automatic trade condition may be established by providing an interface to a user as exemplified in FIG. 6. Remaining portions except the automatic trade condition set-up unit in FIG. 6 are the same as those indicated in reference numerals 401 through 410 in FIG. 4.

However, in the present embodiment, an example is given as possessing 10,000 shares of DEF company and selling 100 shares of DEF company at 10,000 Won per share.

A standard quantity 602 in the automatic trade condition establishes a standard selling and purchase at every automatic trade. Fee rates (and tax) of securities company to be paid at the share trading are entered into a column 604, which is not essential but conducive to calculation of profits after the stock trading. Purchase price and selling quantity of automatic trade are established at columns 606, 608, 610 and 612. The purchase price may be established at a predetermined lower price or at a predetermined lower rate than the selling price at every trading.

An automatic purchase price lower by 500 Won than the selling price is established at every trading in FIG. 6.

Furthermore, automatic purchase quantity may be established at a fixed rate or at a fixed quantity in column 610. If the column 612 is blank, the automatic purchase order at every trading is 100 shares as the set-up standard quantity 602. Plus(+) and minus(−) symbols may be used in column 612, and in case of using plus(+), the automatic purchase order quantity is increased by a fixed rate or fixed quantity, and in case of using minus(−), the automatic purchase order quantity is decreased by a fixed rate or by fixed quantity.

The automatic selling condition is also set up in columns 614, 616, 618 and 620 in the same manner as above. The present embodiment is established as automatically selling 100 shares at a price more increased or more decreased by 1,000 Won than the initial selling price at every trading. An extra trade condition may be established at a fixed rate or at a fixed quantity in columns 622 and 624. The extra trade condition will be further described later.

The user may establish a target profit or earning rate at column 626. If the target profit rate is not set-up, the automatic trading continues unless stopped by the user. However, it is easy for the computer to calculate an earning rate at every automatic trading, and it is preferable to automatically stop the automatic trading when a certain profit rate is earned.

The user may use a trade table application button 628 to draw up an automatic trade table as shown in FIG. 7. However, the automatic trade table can be imaginary, so that make-up of visual table is selective. In other words, the system according to the present invention can realize the third embodiment of the present invention just by storing a formula or logic for drawing up the automatic trade table 700.

The automatic trade table 700 in FIG. 7 is made according to the automatic trade establishment condition in FIG. 6.

The automatic trade table 700 is made such that each selling price in selling row 714 is less by 1,000 Won at each line thereof while each purchase price at each purchase row 712 is less by 500 Won than each corresponding line of selling price.

On the automatic trade table 700, prices in the same lines as in 702 through 710 are appropriately adjusted up and down on the basis of the initial trade price.

Unlike the example in FIG. 6, in case the trade condition is determined at a fixed rate of percentage, purchase price or selling price of the trade table or order quantity may be created in decimal points. However, the KSE has stipulated that shares should be traded on a 50 Won unit base in case a share price is ranged between 10,000 Won to 50,000 Won, to thereby limit units of trade price and quantity, and if the stipulation cannot be observed, share price is changed to an approximate one or rounded to amend the trade table.

In most of cases, the trade table is adjusted to an approximate price to cater to trade regulations of each country, which can be automatically performed by computer, each column in the trade table is allowed to be amended in order quantity, selling price or purchase price as a user desires. FIG. 7 is an example not amended or changed. The trade table 700 is confirmed by a trade table confirmation button 716 pressed by a user.

With reference to FIG. 5, as soon as an initial selling succeeds, a first automatic purchase order and automatic selling order are created by the automatic trade table according to the automatic trade condition previously set up, step 512. In the third embodiment, it is designed "to buy the same stock at a lower price and to sell at a higher price".

Accordingly, when an initial selling order is concluded, a purchase order at a price just below the contracted initial selling price (10,000 Won) (i.e. purchase of 100 shares at a purchase price of 9,500 Won) is placed (see line 706 in FIG. 7), and a selling order at a price just higher than the contracted selling price (i.e. selling of 100 shares at a selling price of 11,000 Won) is placed (see selling column at line 704 in FIG. 7).

These selling and purchase orders are within the account balance and possessed number of shares, such that no errors are generated at steps 506 and 508.

When a purchase order is contacted as ordered in a first automatic trade order, a purchase order and a selling order approximate to the order price contracted in the automatic trade table 700 are generated. As previously mentioned the third embodiment is so designed as to buy "at a lower price" than just-contracted price "and sell at a higher price", such that a second automatic trade order is created through steps of FIG. 5 (steps 514, 516, 506 and 508) where a purchase order (100 shares purchased at 8,500 Won, see line 708 in FIG. 7) and a selling order (100 shares sold at 10,000 Won) are placed.

When a selling order is concluded at the second automatic trade order, a purchase order (100 shares bought at 9,500 Won) close to contracted order price (10,000 Won at the second order) and a selling order (100 shares sold at 11,000 Won) are automatically generated at the third automatic order. In order words, each automatic trade order generates a purchase order at a price just lower than the contracted price at the automatic trade table 700 and a selling order just higher than the contracted price.

When an automatic trade is performed according to the third embodiment, a certain profit is created in case the share price vertically fluctuate around a price range of the initial trade price. By way of example, in case a share price in FIG. 7 rises from 10,000 Won to 14,000 Won and drops to 10,000 Won, a predetermined earning is generated. Furthermore, even in case a share price drops from 10,000 Won to 4,000 Won and rises to 10,000 Won, a certain profit is gained. As apparent from this, the third embodiment may be an appropriate investment method for a stock where a share price thereof frequently and vertically fluctuates at a certain price range.

The extra trade condition in FIG. 6 may be established to increase a selling quantity and purchase quantity in case an automatic trade is again generated at the same price after the automatic trade is initiated, in other words, in case a purchase order and selling order are twice generated at the same price according to fluctuation of the share price.

Referring to FIG. 5 again, a discrimination is made as to whether a purchase condition and a selling condition are met by comparing the established automatic trade condition with balance of securities account and possessed stocks, steps 506 and 508. In order to buy stocks, at least more money should remain in the account than established purchase quantity multiplied by established purchase price, and in order to sell, at least more stocks are possessed than the desired selling quantity. In case only purchase is continuously contracted by the automatic trade, possessed balance in the securities account may be drained out, and in case only selling is continuously concluded, a case may occur where possessed stocks are drained out.

In case steps 506 and 508 are met, the automatic trade purchase order and selling order are simultaneously generated, step 512, and in case the steps 506 and 508 are not satisfied, an error occurs, and the occurrence of error is notified to the stock investor by an appropriate method, step 510.

By way of example, the occurrence of error may be so established that an error message is displayed on the user interface or an alarm sound may be generated. Furthermore, a system may be so constructed as to notify to the stock investor by way of wire, wireless or pager when an error happens. These kinds of error notifying methods may be realized by known arts.

As mentioned above, in case steps 506 and 508 are satisfied, stock purchase order and stock selling order are created, step 512. At this time, it should be noted that the purchase order and selling order are generated at the same time.

The third embodiment is quite different in this regard from the conventional stock investment method. In the third embodiment, the current share price is disregarded and price change of stocks is not anticipated at all.

According to the third embodiment, a certain quantity is purchased when a share price drops compared with previously bought share price and when the share price rises compared with the previously purchase share price, a certain quantity is sold.

A discrimination is made as to whether or not a trade is contracted at step 514. The contracted trade order may be either a selling order or a purchase order, or neither order can be contracted. In case both orders are not contracted, same purchase order and selling order are created on the next day. Exceptional cases such as partial contract, a contract with a price different from an order price and the like may occur. In case of partial contract, whole order quantity may be considered as contracted, or a selling order and purchase order of the same price for the stocks not contracted may be generated.

Furthermore, in case a contract is made at a price different from the order price, a purchase order just below a contracted price and a selling order just above the contracted price are created.

Whichever order is concluded, account balance and stock remainders are revised, step 516, and if condition is met according to the automatic trade condition pre-set up at steps 506 and 508, a new purchase order and a new selling order are immediately generated.

In the third embodiment, a closing price is received from the computer system 20 or the KSE computer system 30, step 504 to use same as a discriminating reference of purchase condition and selling condition. In case ex-dividend or the like occurs, cases may occur where reference price is different from the closing price of previous day. Furthermore, many exceptional circumstances such as reduction of capital, stock split, consolidation in par value and the like can happen in the stock market and when these cases happen, it is necessary to automatically stop the automatic trade by way of system.

A fourth embodiment of the present invention is a variation of the third embodiment and is characterized in that at least two or more than two purchase orders and at least two or more than two selling orders are simultaneously created. In case there occur a large volume of purchase orders or selling orders in the stock market, trade orders in various price ranges are concurrently concluded to rapidly and broadly change the stock prices.

In case three selling orders and three purchase orders are set up to be simultaneously generated in the fourth embodiment, three selling orders, each about 10,000 Won based on initial contract price of 10,000 Won, (i.e., 100 shares sold, each at 11,000 Won, 100 shares sold, each at 12,000 Won and 100 shares sold, each at 13,000 Won) and three purchase orders, each below 10,000 Won of initial contract price (i.e., 100 shares bought, each at 9,500 Won, 100 shares bought, each at 8,500 Won and 100 shares bought, each at 7,500 Won) are concurrently created, as in FIG. 7.

If any one of the six orders is contracted, balance of five orders is immediately cancelled the moment above one contract is concluded, and as automatic trade orders thereafter, one purchase order and one selling order corresponding to the contract in the third embodiment are created. The fourth embodiment is particularly useful to reserve orders before the stock market is open and after the stock market is closed. The fourth embodiment may be embodied by additionally providing a column for limiting the number of plural orders in the automatic trade condition of FIG. 6.

The first, second, third and fourth embodiments according to the present invention are embodied by the system illustrated in FIGS. 1 and 2. Information received from the computer system 30 of KSE or other computer (not shown) connected to Internet is compared with automatic trade condition previously set up by a user according to the trade condition control module 16 to discriminate whether or not purchase condition and/or selling condition are/is satisfied. As a result of the discrimination, if the condition(s) is(are) met, a selling order and/or purchase order are(is) placed with the trade performing module 24 of the computer system 20 at the securities company according to the trade order control module 14.

This kind of discrimination and trade order is repeatedly executed, with receipt of a market information on real time from the activated start of automatic order system such that the trade orders are placed several times in a day. Once the trade order is placed by the trade order control module 14, the account control module 26 discriminates whether account balance and remaining stocks are not out of limit, and the trade order is, once placed, transmitted to the computer system 30 of KSE by the trade performing module 24.

The trade conclusion control module 34 at the computer system of KSE receives the order to compare same with trade order of other securities companies, and if an appropriate price is formed, the trade is accomplished where the trade contract is notified to the trade performing module 24. The trade performing module 24 again notifies the contracted price and quantity to the account control module 26 and the trade condition control module 14, against which the account control module 26 rectifies the balance and remaining quantity, where the trade condition control module 14 separately stores the actually contracted trade condition and amends the trade condition according to the user instruction or set-up state.

Although the present invention has been described with reference to specific embodiments, the invention is not intended to be limited to the embodiments disclosed, which are considered to be purely exemplary. Although the above embodiment has described a desired purchase price, selling price and trade quantity as automatic trade condition of stocks, other conditions such as increase/decrease of composite share index, increase/decrease of stock trade volume, technical index and the like may be established as automatic trade condition.

Furthermore, although the present invention has described about stocks, bonds, future, options, foreign current exchanges, grains, minerals, index swaps and the like which are traded in the similar manner as stocks may be applied.

As apparent from the foregoing, there is an advantage in the automatic ordering method and system for trading of stocks according to the present invention thus described in that an investor can reduce loss of time consumed for monitoring stock market situation or for input of orders, while securities company can decrease time and cost for inputting and managing the trade orders.

There is another advantage in that a possibility of erroneously inputting data necessary for stock trade orders can be fundamentally ruled out to thereby prevent investment loss resulted from the erroneous input.

What is claimed is:

1. An automatic ordering method for trading of stocks, bonds, items, futures, options, indexes, and/or foreign currencies using a computer system connected to a data communication network, comprising:
   (a) the user selecting a trade-desired object and inputting an initial trade condition for selling or purchasing the selected object in the computer system, the initial trade condition including a price for selling or purchasing and a trade-desired quantity;
   (b) the user inputting an automatic trade condition containing purchase and selling conditions in the computer system, the automatic trade condition comprising conditions for deciding a selling price, a selling quantity, a purchase price and a purchase quantity for subsequent orders;
   (c) the user placing an initial trade order according to the initial trade condition in the computer system through the data communication network;
   (d) the computer system, without an intervention by the user, generating and placing a purchase order and a selling order for trade according to the automatic trade condition immediately after the initial trade order has been contracted;
   (e) immediately after one of the selling order and the purchase order is contracted, the computer system, without an intervention by the user, generating and placing another purchase order and another selling order for trade according to the automatic trade condition; and
   (f) the computer system repeating the process (e);
   wherein the selling order in each of the processes (d) and (e) is higher than the contracted price in each of the processes (d) and (e), and the purchase order price in each of the processes (d) and (e) is lower than the contracted price in each of the processes (d) and (e).

2. The method as defined in claim 1, wherein the trade-desired object is stocks, futures, or options.

3. The method as defined in claim 2, wherein the automatic trade condition generates selling and purchase order prices increased or decreased by a fixed amount from the previously generated orders.

4. The method as defined in claim 3, wherein inputting the automatic ordering condition further comprises drawing up an automatic trade table, where an automatic trade order is generated from the automatic trade table.

5. The method as defined in claim 2, wherein the automatic trade condition generates selling and purchase order prices increased or decreased by a fixed rate from the previously generated orders.

6. The method as defined in claim 5, wherein inputting the automatic ordering condition further comprises drawing up an automatic trade table, where an automatic trade order is generated from the automatic trade table.

7. The method as defined in claim 2, wherein the automatic trade condition in the process (b) includes a target profit rate, and the process (f) further comprises calculating a profit rate from the completed contracts before repeating the process (e); comparing the calculated profit with the target profit rate; and the computer system stopping the automatic trading if the target profit is obtained.

8. An automatic ordering method for trading of securities using a computer system connected to a data communication network, comprising:
   (a) selecting, by a user, at least one of the securities to be traded and inputting an initial trade condition and an automatic trade condition containing purchase and selling conditions in the computer system, the automatic trade condition determining a selling price, a selling quantity, a purchase price and a purchase quantity in every order subsequently generated;
   (b) the computer system placing an initial order for purchase or sell according to the initial trade condition through the data communication network;
   (c) when immediately after the initial order is contracted, the computer system automatically, without an intervention by the user, generating and placing both a new sell order and a new purchase order through the data communication network according to the automatic trade condition, the sell order being at a price higher than the contracted price for the initial order and the purchase order being at a price lower than the contracted price for the initial order;
   (d) when immediately after one of the newly placed sell and purchase orders is contracted, the computer system automatically, without an intervention by the user, generating and placing a new purchase order and a new sell order for trade according to the automatic trade condition, the sell order being at a price higher than the previously contracted price and the purchase order being at a price lower than the previously contracted price; and
   (e) the computer system repeating the process (d).

9. The method as defined in claim 8, wherein the automatic trade condition generates selling and purchase order prices increased or decreased by a fixed amount from the previously generated orders.

10. The method as defined in claim 8, wherein the automatic trade condition generates selling and purchase order prices increased or decreased by a fixed rate from the previously generated orders.

11. The method as defined in claim 8, wherein inputting the automatic ordering condition further comprises drawing up an automatic trade table, where an automatic trade order is generated from the automatic trade table.

12. The method as defined in claim 8, wherein the automatic trade condition in the process (b) includes a target profit rate, and the process (f) further comprises calculating a profit rate from the completed contracts before repeating the process (e); comparing the calculated profit with the target profit rate; and the computer system stopping the automatic trading if the target profit is obtained.

13. An automatic ordering system of stocks, the system including a user computer system connectable to a computer system at a stock exchange through a data communication network, the system comprising:
   a user interface at the user computer system for the user to input an automatic trade condition;

a memory device for storing basic information data including an item code of a stock and an account number of a stock holder input to the computer system through the user interface;

a trade condition control module for storing an automatic stock trade condition based on which a selling order including price and quantity and a purchase order including price and quantity for trade of the stock are determined; and a trade order control module for determining whether the automatic stock trade condition has been met and for placing a stock trade order according to the automatic stock trade condition at a new price through the data communication network if the condition is met, wherein through the data communication network, the trade order control module places repeatedly, without an intervention by the user, a new stock selling and a new purchase order according to the automatic trade condition immediately after the stock selling or purchase order is contracted at a contracted price, the new selling order price is higher than the contracted price, and the new purchase order price is lower than the contracted price.

* * * * *